June 3, 1969
D. P. HART ET AL
3,448,027
ELECTRODEPOSITION COMPOSITIONS AND METHODS USING
A BASIC LEAD SILICO CHROMATE PIGMENT
Filed Oct. 22, 1965
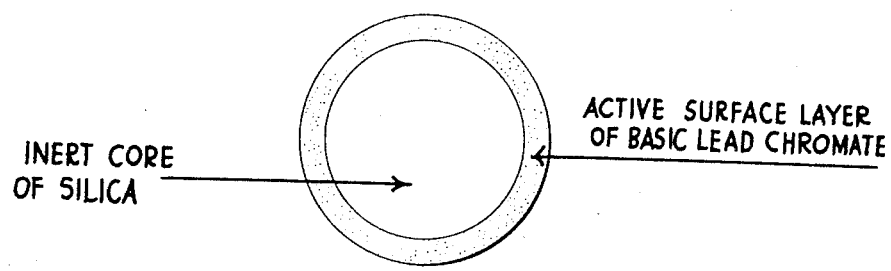
INVENTORS
DONALD P. HART
JOSEPH E. PLASYNSKI
BY
ATTORNEYS

United States Patent Office 3,448,027
Patented June 3, 1969

3,448,027
ELECTRODEPOSITION COMPOSITIONS AND METHODS USING A BASIC LEAD SILICO CHROMATE PIGMENT
Donald P. Hart, North Olmsted, Ohio, and Joseph E. Plasynski, Arnold, Pa., assignors to PPG Industries, Inc., a corporation of Pennsylvania
Filed Oct. 22, 1965, Ser. No. 502,175
Int. Cl. B01k 5/00; C23b 13/00
U.S. Cl. 204—181     13 Claims

ABSTRACT OF THE DISCLOSURE

This invention relates to electrodepositable compositions having increased throw power, containing basic lead silico chromate, and the method of preparation which comprises aging under acid conditions to cause lead soap formation.

---

Electrodeposition is a relatively new coating technique, which, although based on well-known principles, has only recently become technically feasible through the development of electrodepositable compositions which have the desired characteristics to meet the demands placed on a modern coating material. The coating achieved have excellent properties for many applications and electrodeposition results in a coating which does not run or wash off duing baking. Virtually any conductive substrate may be coated by electrodeposition. Most commonly employed substrates include base metals such as iron, steel, copper, zinc, brass, tin, nickel, chromium and aluminum, as well as other metals and pretreated metals. Impregnated paper and other substrates rendered conductive under the conditions employed may also be coated.

In the electrodeposition process, an aqueous bath containing a coating composition is placed in contact with an electrically conductive anode and an electrically conductive cathode. The surface to be coated is employed as one of the electrodes. Upon the passage of an electric current between the anode and the cathode while in contact with the bath containing the coating composition, an inherent film of the coating composition is deposited on one of the electrodes. Where the electrodepositable vehicle is a polycarboxylic acid resin, the resin is coated on the anode.

Electrodeposition is in many respects advantageous compared to ordinary application methods. For example, electrodeposition can produce uniformly thick coatings even over sharp corners, on edges, and within lapped or boxed sections. The ability to coat within lapped or boxed areas is particularly important since there is little or no loss of protection in the enclosed areas due to solvent wash when baking, which is a problem when dipped coating are used. In electrodeposition, the ability to deposit coatings in areas remote or shielded from the oppositely charged electrode is called "throwing power." It has now been found that the "throw power" of an electrodepositable composition can be substantially increased by incorporating into the electrodepositable composition a pigment comprising basic lead silico chromate under conditions which expose the pigment to free carboxylic acid groups.

The term "basic lead silico chromate," as used throughout the specification, refers to pigment coated particles which are known in the art, and specifically to pigment particles which have an inert core of silica and an active surface layer of basic lead chromate. FIGURE 1 is an idealized drawing of such a pigment particle. Typical of such pigments are National Lead M–50 and Oncor S–25. The basic lead silico chromates are qualified as follows:

|  | M–50 | S–25 |
| --- | --- | --- |
| Color | Orange | Orange |
| Specific gravity | 4.1 | 5.1 |
| Pounds per solid gallon | 34.1 | 42.5 |
| Oil absorption | 13–15 | 13–15 |
| Coarse particles (325 mesh), percent | 0.1 | 0.1 |
| Lead oxide (PbO), percent | 47.0 | 67.5 |
| Chromic trioxide (CrO$_3$), percent | 5.4 | 7.5 |
| Silica (SiO$_2$), percent | 47.6 | 25.0 |

A number of electrodepositable resins are known and can be employed to provide the electrodepositable composition of this invention. Virtually any water-soluble, water-dispersible or water-emulsifiable polycarboxylic resinous material can be electrodeposited and, if film-forming, provides a coating which may be suitable for certain purposes. Any such electrodepositable polycarboxylic acid resinous material is included among those which can be employed in the present invention, even though the coating obtained may not be entirely satisfactory for certain specialized uses.

The prefererd resins which may be employed in the process invention comprise a reaction product or adduct of the drying oil or semi-drying oil fatty acid ester with a dicarboxylic acid or anhydride. By drying oil or semi-drying oil fatty acid esters are meant esters of fatty acids which are or can be derived from drying oils or semi-drying oils, or from such sources as tall oil. Such fatty acids are characterized by containing at least a portion of poly-unsaturated fatty acids. Preferably, the drying oil or semi-drying oil per se is employed. Generally, drying oils are those oils which have an iodine value of above about 130, and the semi-drying oils are those which have an iodine value of about 90 to 130, as determined by method ASTM D1467–57T. Examples of such esters include linseed oil, soya oil, safflower oil, perilla oil, tung oil, oiticica oil, poppyseed oil, sunflower oil, tall oil esters, walnut oil, dehydrated castor oil, herring oil, menhadan oil, sardine oil and the like.

Also included among such esters are those in which the esters themselves are modified with other acids, including saturated, unsaturated or aromatic acids such as butyric acid, stearic acid, linoleic acid, phthalic acid, isophthalic acid, terphthalic acid or benzoic acid, or an anhydride of such an acid. One inexpensive acid material which has been found to produce good results in many instances is rosin, which is composed of chiefly abietic acid and other resin acids. The acid modified esters are made by transesterification of the ester, as by forming a di- or monoglyceride by alcoholysis, followed by esterification with the acid; they may also be obtained by reacting oil acids with a polyol and reacting the acid with the partial ester. In addition to glycerol, alcoholysis can be carried out using other polyols such as trimethylolpropane, pentaerythritol, sorbitol, and the like. If desired, the esters can also be modified with monomers such as cyclopentadiene or styrene and the modified esters produced thereby can be utilized herein. Similarly, other esters of unsaturated fatty acids, for example, those prepared by the esterification of tall oil fatty acids with polyols, are also useful.

Also included within the terms "drying oil fatty acid esters" and "semi-drying oil fatty acid esters" as set forth herein are alkyd resins prepared utilizing semi-drying or drying oils; esters of epoxides with such fatty acids, including esters of diglycidyl ethers of polyhydric compounds as well as other mono-, di- and polyepoxides; semi-drying or drying oil fatty acid esters of polyols, such as butanediol, trimethylolethane, trimethylolpropane, trimethylolhexane, pentaerythritol, and the like; and semi-drying or drying fatty acid esters of resinous polyols such as homopolymers or copolymers of unsaturated aliphatic alcohols, e.g., allyl alcohol or methallyl alcohol, including copolymers of such alcohols with styrene or other ethylenically unsaturated monomers or with non-oil modified alkyd resins containing free hydroxyl groups.

Any alpha, beta-ethylenically unsaturated dicarboxylic acid or anhydride can be employed to produce the reaction products described herein. These include such anhydrides as maleic anhydride, itaconic anhydride, and other similar anhydrides. Instead of the anhydride, there may also be used ethylenically unsaturated dicarboxylic acids which form anhydrides, for example, maleic acid or itaconic acid. These acids appear to function by first forming the anhydride. Fumaric acid, which does not form an anhydride, may also be utilized, although in many instances it requires more stringent conditions than the unsaturated dicarboxylic acid anhydrides or acids which form such anhydrides. Mixtures of any of the above acids or anhydrides may also be utilized. Generally speaking, the anhydride or acid employed contains from 4 to 12 carbon atoms, although longer chain compounds can be used if so desired.

While the exact nature of the reaction product of the acid or anhydride with the fatty acid ester is not known with certainty, it is believed that the reaction takes place by addition of the unsaturated linkage of the acid or anhydride to the carbon chain of the oil. In the case of non-conjugated double bonds, such as are present in linseed oil, the reaction may take place with the methylene group adjacent the non-conjugated double bond. In the case of oils having conjugated double bonds, such as tung oil, the reaction is probably of the Diels-Alder type.

The reaction between the acid or acid anhydride and the drying oil or semi-drying oil fatty acid ester takes place readily without the use of a catalyst and at temperatures in the range of about 100° C. to about 300° C. or higher, with the reaction generally being carried out between about 200° C. and about 250° C.

While the reaction products can be comprised solely of adducts of the fatty acid ester and the dicarboxylic acid or anhydride, in many instances it is desirable to incorporate into the reaction product another ethylenically unsaturated monomer. The use of such monomer often produces films and coatings which are harder and more resistant to abrasion and which may have other similar desirable characteristics. For this purpose, any ethylenically unsaturated monomer can be employed. Examples of such monomers include monoolefinic and diolefinic hydrocarbons such as styrene, alpha-methyl styrene, alpha-butyl styrene, vinyl toluene, butadiene-1,3, isoprene, and the like; halogenated monoolefinic and diolefinic hydrocarbons, such as alpha-chlorostyrene, alpha-bromostyrene, chlorobutadiene and similar compounds; esters of organic and inorganic acids, such as vinyl acetate, vinyl propionate, vinyl 2-chlorobenzoate, methyl acrylate, ethyl methacrylate, butyl methacrylate, heptyl acrylate, decyl methacrylate, methyl crotonate, isopropenyl acetate, vinyl alpha-bromopropionate, vinyl alpha-chlorovalerate, allyl chloride, allyl cyanide, allyl bromide, allyl acetate, dimethyl itaconate, dibutyl itaconate, ethyl alpha-chloroacrylate, isopropyl alpha-bromoacrylate, decyl alpha-chloroacrylate, dimethyl maleate, diethyl maleate, dimethyl fumarate, diethyl fumarate, and diethyl glutaconate; organic nitriles, such as acrylonitrile, methacrylonitrile and ethacrylonitrile; and the like.

As is apparent from the above discussion and the examples set forth, which, of course, do not include all of the ethylenically unsaturated monomers which may be employed, any such monomer can be utilized. The preferred class of monomers can be described by the formula:

(I)

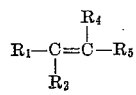

where $R_1$ and $R_2$ are hydrogen or alkyl, $R_4$ is hydrogen, alkyl or carboxyalkyl and $R_5$ is cyano, aryl, alkyl, alkenyl, aralkyl, alkaryl, alkoxycarbonyl or aryloxycarbonyl. The preferred compounds are styrene substituted styrenes alkyl acrylates alkyl methacrylates diolefins and acrylonitrile.

The reaction of the fatty acid ester, the acid or anhydride and any additional monomer or monomers can be carried out concurrently, that is, with each of the components of the reaction product being mixed together and heated to reaction temperature. However, because the monomer and the acid or anhydride are often quite reactive with each other, the oil or other fatty acid ester is preferably first reacted with the acid or acid anhydride, and then this product is subsequently reacted with any ethylenically unsaturated monomer or monomers employed. For example, a reaction product of linseed oil, maleic anhydride and styrene is made by first reacting maleic anhydride with linseed oil and then reacting the maleinized oil with styrene. When the process is carried out in this manner, the reaction of the additional monomer with the initial reaction product is usually carried out at somewhat lower temperatures, usually between about 25° C. and 200° C.

The proportions of each of the components going to make up the reaction product are ordinarily not critical. Generally speaking, between about 10 percent and about 45 percent by weight of the unsaturated acid or acid anhydride is reacted with from about 55 percent to about 90 percent by weight of fatty acid ester. In the presently preferred products, usually 15 percent to 30 percent of anhydride and 70 percent to 85 percent of oil ester are employed. If an ethylenically unsaturated monomer is incorporated in the reaction product, it is typically used in amounts between about 5 percent and about 35 percent by weight, based upon the total weight of acid or anhydride and ester, with between 10 percent and 25 percent being used in those products preferred at present. Thus, in most instances the total composition of the reaction product may comprise from about 35 percent to about 90 percent by weight of the fatty acid ester and from about 10 percent to about 65 percent of the acid or anhydride and other monomer combined, with between about 6 percent and about 45 percent of the acid or anhydride always present.

The products produced in the above manner are comprised of polymeric chains of moderate length. The average molecular weight of the products to be used in electrodeposition should be low enough so that its flow charateristics at high solids are maintained, but high enough to provide adequate throwing power. The desirable molecular weight levels vary with the coating composition and conditions employed. Generally those having molecular weights of up to 10,000 or somewhat higher have given the best results.

Neutralization of these products is accomplished by reaction of all or part of the dicarboxylic anhydride groups with a base. Usually up to about half of such groups are neutralized in unesterified adducts; the patrially esterified products are often neutralized to a greater extent, based on unesterified acid groups remaining.

It is preferred in certain instances that the neutralization reaction be carried out in such a manner that amido groups are attached to part of the carbonyl carbon atoms derived from the dicarboxylic acid or anhydride. By amido groups are meant trivalent nitrogen atoms attached with one valence to the carbonyl carbon atom with the other two valences being linked to hydrogen or carbon atoms in the same or different organic radicals. Amido groups are formed, for example, when the reaction with the neutralizing base is carried out with a water solution of ammonia, a primary amine or a secondary amine, or when the product is reacted with such an amine in the absence of water.

Compositions within this general class are described in copending applications, Ser. No. 222,674, filed Sept. 10, 1962 now U.S. Patent 3,366,563, and Ser. No. 282,880, filed May 24, 1963, now U.S. Patent 3,369,983.

Another type of electrodepositable coating composition which gives desirable results are the water-dispersible coating compositions comprising at least partially neutralized interpolymers of hydroxyalkyl esters of unsaturated carboxylic acids, unsaturated carboxylic acids and at least one other ethylenically unsaturated monomer. These are employed in the composition along with an amine-aldehyde condensation product or a polyepoxide, or both, with the interpolymer usually making from about 50 percent to about 95 percent by weight of the resinous composition.

The acid monomer of the interpolymer is usually acrylic acid or methacrylic acid, but other ethylenically unsaturated monocarboxylic and dicarboxylic acids, such as ethacrylic acid, crotonic acid, maleic acid, or other acids of up to about 6 carbon atoms can also be employed. The hydroxyalkyl ester is usually hydroxyethyl or hydroxypropyl acrylate or methacrylate, but also desirable are the various hydroxyalkyl esters of the above acids having, for example, up to about 5 carbon atoms in the hydroxyalkyl radical. Mono- or diesters of the dicarboxylic acids mentioned are included. Ordinarily, the acid and ester each comprise between about 1 percent and about 20 percent by weight of the interpolymer, with the remainder being made up of one or more other copolymerizable ethylenically unsaturated monomers. The most often used are the alkyl acrylates, such as ethyl acrylate; the alkyl methacrylates, such as methyl methacrylate; and the vinyl aromatic hydrocarbons, such as styrene; but others can be utilized.

The above interpolymer is at least partially neutralized by reaction with a base as described above; at least about 10 percent, and preferably 50 percent or more of the acidic groups are neutralized, and this can be carried out either before or after the incorporation of the interpolymer in the coating composition. The bases above can be used, with ammonia and amines being preferred; except when a polyepoxide is present, in which case there is preferably employed a hydroxide, such as sodium hydroxide, or if an amine, a tertiary amine.

The amine-aldehyde condensation products included in these compositions are, for example, condensation products of melamine, benzoquanamine, or urea with formaldehyde, although other amino-containing amines and amides, including triazines, diazines, triazoles, guanadines, guanamines and alkyl and aryl-substituted derivatives of such compounds can be employed, as can other aldehydes, such as acetaldehyde. The alkylol groups of the products can be etherified by reaction with an alcohol, and the products utilized can be water-soluble or organic solvent-soluble.

The electrodepositable compositions can also include a polyepoxide, which can be any epoxide compound or mixture with an epoxy functionality of greater than 1.0. Numerous such polyepoxides are known and are described in patents such as U.S. Patents Nos. 2,467,171, 2,615,007, 2,716,123, 2,786,067, 3,030,336, 3,053,855, and 3,075,999. Included are polyglycidyl ethers of polyphenols such as bisphenol A, or of aliphatic polyhydric alcohols, such as 1,4-butanediol; polyglycidyl esters of polycarboxylic acids, such as diglycidyl adipate; and polyexpoxides from the epoxidation of unsaturated alicyclic compounds, such as 3,4 - epoxy - 6 - methylcyclohexylmethyl - 3,4 - epoxy-6-methyl-cyclohexanecarboxylate.

Electrodespositable compositions comprising the above interpolymers and an amine-aldehyde resin or a polyepoxide, or both, are more fully described in copending application Ser. No. 368,394, filed May 18, 1964, now U.S. Patent 3,403,088.

Still another electrodepositable composition of desirable properties comprises an alkyd-amine vehicle, that is, a vehicle containing an alkyd resin and an amine-aldehyde resin. A number of these are known in the art and may be employed. Preferred are water-dispersible alkyds such as those in which a conventional alkyd (such as a glyceryl phthalate resin), which may be modified with drying oil fatty acids, is made with a high acid number (e.g., 50 to 70) and solubilized with ammonia or an amine, or those in which a surface active agent, such as a polyalkylene glycol (e.g., "Carbowax"), is incorporated. High acid number alkyds are also made by employing a tricarboxylic acid, such as trimellitic acid or anhydride, along with a polyol in making the alkyd.

The above alkyds are combined with a amine-aldehyde resin, such as those described hereinabove. Preferred are water-soluble condensation products of melamine or a similar triazine with formaldehyde with subsequent reaction with an alkanol. An example of such a product is hexakis(methoxymethyl) melamine.

The alkyd-amine compositions are dispersed in water and they ordinarily contain from about 10 percent to about 50 percent by weight of amine resin based on the total resinous components.

Examples of compositions of this class are described in U.S. Patents Nos. 2,852,475, 2,852,476, and 2,853,459.

The neutralization and solubilization of the above vehicles is accomplished by the use of a base. Inorganic bases such as metal hydroxides or, more desirably, ammonia can be used for this purpose, as can organic bases, particularly amines. Among the preferred class of neutralizing bases are ammonia and any basic amine. Examples of such amine are primary and secondary amines, including alkyl amines, such as methylamine, ethylamine, propylamine, butylamine, amylamine, dimethylamine, diethylamine, dipropylamine, dibutylamine, and N-methylbutylamine; cycloalkyl amines, such as cyclohexylamine; unsaturated amines, such as allylamine, 1,2-dimethylpentenylamine and pyrrole; aryl amines, such as aniline; aralkyl amines such as benzylamine and phenethylamine; alkaryl amines, such as m-toluidine, cyclic amines, such as morpholine, pyrrolidine and piperidine; diamines, such as hydrazine, methylhydrazine, 2,3-toluenediamine, ethylene-diamine, 1,2-naphthalenediamine and piperazine; and substituted amines, such as histamine, hydroxylamine, ethanolamine, and diethanolamine; as well as tertiary amines such as trimethylamine, triethylamine, dimethylethanolamine, N-methyl morpholine, triethanolamine and the like.

It has been found advantageous in many instances to effect part of the neutralization with certain solid amines, notably amino-alkyl-alkanediols, such as, for example, 2-methyl-2-amino-1,3-propanediol, 2-ethyl - 2 - amino-1,3-propanediol, or 2-methyl-2-amino-1,4-butanediol. The films produced when a small amount of such amines are employed are considerably harder and often have improved water resistance. However, preferably not more than about 4 percent by weight of the resinous components of these solid amines are utilized, since they are relatively expensive and greater amounts do not further improve the film's properties and may even slightly decrease its water resistance.

The electrodepositable coating compositions of the instant invention comprise the above vehicles, containing a lead silico-chromate-containing pigment composition. The pigment composition, in addition to lead silico chromate, may be of any conventional type, comprising, for example, iron oxides, lead oxides, carbon black, titanium dioxide, talc, barium sulfate, strontium chromate, and the like, as well as combinations of these and similar pigments. Color pigments such as cadmium yellow, cadmium red, phthalocyanine blue, chromic yellow, toluidine red, hydrated iron oxide and the like may be included if desired. Better results with pigmented compositions are attained if the weight ratio of pigment solids to vehicle solids is not higher than about 1.5 to 1, preferably not higher than about 1 to 1.

There may also be included in the coating composition, if desired, additives such as antioxidants, for example, orthoamyl phenol or cresol (the commercial mixture of isomeric cresols is satisfactory). It is found especially advantageous to include such antioxidants in coating compositions which are used in baths which may be exposed to atmospheric oxygen at elevated temperatures and with violent agitation over extended periods of time.

In formulating the coating composition, ordinary tap water may be employed. However, such water may contain a relatively high level of metals and cations; while not rendering the process inoperative, the use of water containing these cations may result in variations in the properties of the bath when used for electrodeposition. Thus, it is often desirable to utilize deionized water, i.e., water from which free ions have been removed as by passage through an ion exchange resin, in making up the coating compositions of the invention.

Other additives which may be included in the coating composition if desired include, for example, wetting agents such as petroleum sulfonates, sulfated fatty amides, esters of sodium isothionates, or alkylphenoxypolyoxyethylene alkanols, as well as driers such as the linoleates, the naphthenates, the octanates and the tallates of such metals as lead, cobalt, manganese, iron, copper and zirconium. Other additives which may be employed include antifoaming agents, suspending agents, bactericides and the like.

In electrodeposition processes employing the various coating compositions described above, an aqueous bath containing the coating composition is placed in contact with an electrically conductive anode and an electrically conductive cathode. The surface to be coated is employed as one of the electrodes. In the specific examples of compositions described above, the surface to be coated is employed as the anode. Upon the passage of electric current between the anode and the cathode, while in contact with the bath containing the coating composition, an adherent film of the coating composition is deposited. The conditions under which the electrodeposition step herein is carried out are those conventionally used in electrodeposition of coatings. The applied voltage may be varied greatly and can be, for example, as low as 1 volt or as high as several thousand volts, although typically between 50 volts and 500 volts. The current density is usually between about 0.1 ampere and 15 amperes per square foot, and is high initially and tends to decrease during the electrodeposition of a single article.

The concentration of the non-volatile components (i.e., vehicle and any pigments and the like) in the aqueous bath is not critical and relatively high levels can be employed. However, it is ordinarily desirable to use as low a concentration as gives satisfactory results, and in the cases of the above-described compositions, aqueous compositions containing as little as 1 percent by weight of non-volatile solids can be employed, while those containing between 5 percent and 20 percent by weight are preferred.

The process of this invention comprises forming a pigment base by grinding a lead silico chromate-containing pigment. Grinding of the pigment composition containing lead silico chromate is conducted under conditions which do not lead to substantial lead soap formation, since uncontrolled soap formation during the grinding step may lead to gelation or other inconsistent results. Thus, the grinding preferably is conducted in the presence of a substantially neutralized resin or by employing a carboxylic acid resin free grind using dispersing agents or surfactants such as phosphorized ethoxylated aliphatic alcohols and alkyl phenol, and particularly nonylphenolpolyl(ethoxy) phosphate esters. Then, in order to obtain the proper pigment-binder ratio, adding additional resins of such a degree of neutralization that the composition has a substantial number of free carboxylic acid groups. At this point, the composition is aged for a short period. It has been shown that lead salt formation between the lead and the free carboxylic acid groups occurs. At this point, the aging is accomplished after a period of at least about 10 minutes at room temperature; generally the lower the acid value, the longer the period necessary to obtain optimum soap formation. This aging step may be accelerated by heating the mixture below the boiling point of water. The dispersion may then be further neutralized and let down to form electrodeposition compositions. The essential step of the instant invention comprises aging the composition having a substantial number of free carboxyl groups at least to some extent prior to final neutralization. If the pigment base is let down with fully neutralized resin, an appreciable reduction in throwing power is noted.

Grinding of the pigment base may be done by the conventional methods known to the art, such as a ball mill, pebble mill, sand mill and an attritor. The vehicle used in the grinding step should be a neutralized vehicle resin, or at least partially neutralized vehicle resin having a pH of above 7. Preferably, the grinding resin is an aqueous dispersion of a neutralized resin having a pH above about 8.5. The amount of water present in such an aqueous grind is not critical, however, commonly the resin employed in the grinding step is about 20 to 50 percent solids. The use of more water merely reduces the effective capacity of the mills and also when less water is employed there is an increase in viscosity of the material with the attendant problems inherent in high viscosity materials.

The pigment-binder ratio in the grinding step is not critical, however, between about 3.5 to 1 and 7 to 1 are frequently employed, although other levels may be utilized.

The resin used to let down the pigment paste to obtain the desired pigment-binder ratio in the final electrodeposition composition should have a degree of neutralization such that the composition to be aged has a substantial number of free carboxyl groups sufficient to form lead soap and preferably have an acid quotient (as hereinafter defined) between about 60 and about 250.

Acid value, as used throughout the specification, is defined as the number of milligrams of potassium hydroxide required to neutralize a one-gram sample of the material in question. The sample having been dispersed in warm ethanol. A 30-second endpoint is determined, using phenolphthalein as an indicator. The measured value obtained using this technique is not necessarily the true acid value of the material in question, since when the carboxylic acid groups are in the form of an anhydride ring, only one of the two carboxylic acid groups which form the anhydride ring is titrated, the other forming an ester. Therefore, the value obtained by titrating anhydride rings, or that portion of the value theoretically obtained from anhydride rings in a resin containing both anhydride groups and free carboxylic groups must be multiplied by 2 to obtain the true acid value.

The level of acidity present in the electrodeposition composition, however, cannot be directly measured as acid value. Since, although the resin has been partially neutralized, usually with an amine, KOH will replace the amine since it is a stronger base, therefore the resin will titrate as though unneutralized regardless of the amount of amine present.

Therefore, the level of acidity must be indirectly calculated. This value, as used herein, is referred to as the "acid quotient." This value is determined as follows:

(A) Determine the total amount of carboxylic acid resin vehicle present in the composition.

(B) Determine the total amount of neutralizing agent (usually the total amount of amine present in the composition).

(C) Determine the moles of carboxyl groups originally available in one gram of resin.

(D) Determine the moles of amine which theoretically have neutralized one gram of resin.

(E) Subtract (D) from (C) to determine the moles of free carboxylic acid group theoretically remaining in one gram of resin.

(F) Determine the milligrams of KOH that would be necessary to neutralize the carboxylic acid group remaining in one gram of resin as calculated in (E).

This value is then the theoretical acid value that would be obtained if the resin could be titrated without substituting the neutralizing agent already present. This value is the "acid quotient."

Preferably, the let down resin is neutralized to some extent, although unneutralized resins having a low enough acid value may be employed.

The ability to increase the throwing power of an electrodepositable composition containing a corrosion inhibitive pigment was extremely useful. In order to measure the throwing power of an electrodepositable composition, a technique has been borrowed from the electroplating industry. If a pipe is partially immersed in the bath and electrocoated, the ratio of the interior pipe length coated to the internal diameter of the pipe will be a constant for a given composition and set of coating conditions. If the tests are restricted to a common pipe size and immersion depth, the interior pipe length coated can be expressed as a percentage of the immersion depth. For example, a pipe having an internal diameter of 11/16 inch was immersed to a depth of 10 inches (25.4 centimeters) and electroplated. Test paint deposited along the length of about 6 inches of the interior of the pipe. By the convention already described, this can be expressed as 60 percent throwing power.

The invention is further described in conjunction with the followig examples, which are to be considered illustrative rather than limiting. All parts and percentages in the examples and throughout the specification are by weight unless otherwise stated.

EXAMPLE A

A vehicle resin was produced by heating, under an inert gas blanket, a 4-to-1 weight mixture of linseed oil and maleic anhydride at 510° F. to obtain a resin having a final measured acid value of about 80 and a Brookfield viscosity of 90,000 centipoises.

EXAMPLE B

A vehicle resin was prepared by heating a 4-to-1 weight mixture of linseed oil and maleic anhydride at 250° C. over a two-hour period to obtain a resin having a measured acid value of 104 and a viscosity of 32,500 centipoises.

EXAMPLE C

A vehicle resin was prepared by heating 266 parts of the resin of Example B and 7 parts of hydrogenated bisphenol A to 340° F. and holding between 340° F. and 345° F. for one-half hour to obtain a resin having a measured acid value of 87 and a viscosity of 190,000 centipoises.

EXAMPLE I

Two similar electrodepositable compositions were prepared as follows.

A pigment paste (Paste I) was made by grinding the following mixture in a steel ball mill:

| | Parts by weight |
|---|---|
| Deionized water | 23.40 |
| Diethylamine | 1.50 |

The above was mixed and then there was added:

| | Parts by weight |
|---|---|
| Resin A (as in Example A) | 14.0 |

Mixing was continued for 10 minutes and there was added:

| | Parts by weight |
|---|---|
| Cresylic acid | 0.22 |
| Diethylamine | 0.79 |

After an additional period of 10 minutes, the pH was adjusted to 10.0 with diethylamine. There was then added:

| | Parts by weight |
|---|---|
| Dispersing agent (combination oil-soluble sulfonate non-ionic surfactant—Witco 912) | 0.53 |
| Basic lead silico chromate (M–50) | 40.00 |
| Red iron oxide | 11.85 |
| Deionized water | 7.30 |

The above mixture was ground for 16 hours in a steel ball mill to obtain a maximum grind of a 7 Hegman reading.

The electrodeposition primer was formulated as follows:

Premix I

| | Parts by weight |
|---|---|
| Deionized water | 134.0 |
| Diethylamine | 14.9 |

Premix II

| | Parts by weight |
|---|---|
| Resin C (as in Example C) | 229.1 |
| 4 methoxy-4 methyl pentanone-2 (pentoxone) | 18.0 |
| Cresylic acid (dissolved in above pentoxone) | 1.3 |

Premix II was added to Premix I and agitated 10 minutes, then there was added, with continuing agitation:

| | Parts by weight |
|---|---|
| Deionized water | 296.2 |

Agitated 10 minutes and added:

| | Parts by weight |
|---|---|
| Paste I (above) | 218.0 |

Agitated an additional 10 minutes and added:

| | Parts by weight |
|---|---|
| Deionized water | 3648.5 |

The above composition had an initial throw of 7½ inches (10 inch immersion) by the pipe method. After one week's aging of the composition, the throw was 8½ inches.

A second electrodeposition primer was made as follows:

| | Parts by weight |
|---|---|
| Resin C (as in Example C) | 304.1 |
| Diethylamine | 30.5 |

The above was mixed for 45 minutes and there was then added:

| | Parts by weight |
|---|---|
| Cresylic acid | 3.0 |
| Deionized water | 304.1 |

The above was mixed for 15 minutes and then was added:

| | Parts by weight |
|---|---|
| Deionized water | 188.9 |

This mixture is designated "Resin C-solubilized."

The primer was formulated as follows:

| | Parts by weight |
|---|---|
| Resin C-solubilized (above) | 710.0 |
| Paste I (above) | 254.0 |

The above was agitated 10 minutes and there was added:

| | Parts by weight |
|---|---|
| Deionized water | 102.0 |

The above was agitated 10 minutes and there was then added:

| | Parts by weight |
|---|---|
| Deionized water | 4264.0 |

The above primer had an initial throw of 5½ inches by the pipe method. After aging for one week, the throw was 6 inches.

The above primers are substantially identical in composition; however, the first primer was prepared using partially neutralized resin to let down the pigment paste. A significant difference in throw power was noted over the second primer which was let down with resin which had been previously neutralized. Likewise, the first resin could be coated at voltages above the normal rupture voltage of the second composition, i.e., that voltage at which the paint film ruptures and the amperage remains relatively constant or increases.

EXAMPLE II

A pigment paste (Paste B) was made by grinding the following mixture in a continuous attritor:

| | Parts by weight |
|---|---|
| Deionized water | 23.40 |
| Diethylamine | 1.50 |

The above were mixed and then there was added:

| | Parts by weight |
|---|---|
| Resin A (above) | 14.40 |

Mixing was continued for 10 minutes and there was added:

| | Parts by weight |
|---|---|
| Cresylic acid | 0.53 |
| Diethylamine | 0.79 |

After an additional period of 10 minutes, the pH was adjusted to 10.0 with diethylamine. There was then added:

| | Parts by weight |
|---|---|
| Dispersing agent (combination oil-soluble sulfonate non-ionic surfactant—Witco 912) | 0.53 |
| Basic lead silico chromate | 40.00 |
| Red iron oxide | 11.85 |
| Deionized water | 7.30 |

The above final mixture was mixed for 10 minutes and then run through a continuous attritor to attain a maximum grind of 6½ Hegman reading.

The electrodeposition primer was made up as follows:

| | Parts by weight |
|---|---|
| Resin A (above) grams | 228.3 |
| Pentoxone | 18.0 |
| Cresylic acid | 3.4 |

The above were mixed and were added to 15.9 parts of diethylamine dissolved in 134.0 parts deionized water and then the entire mixture was agitated. There was then added:

| | Parts by weight |
|---|---|
| Deionized water | 314.8 |

After a thorough mixing there was added:

| | Parts by weight |
|---|---|
| Paste B (above) | 200.0 |

The mixture was agitated for 10 minutes. Additional amine was then added to bring the pH to 8.2. This composition had increased throw and could be coated at higher voltages than the same resin which is fully neutralized before the pigment paste was added.

The above primer was then diluted with deionized water to bring the solids content of the mixture to 8 percent. The 8 percent solids material was used in the following experiment:

A sample of the above electrodeposition composition was then precipitated with hydrochloric acid. The precipitate was then extracted with diethyl ether and the ether layer washed repeatedly. The ether layer was then evaporated to dryness. Spectographic analysis of the resinous material thus obtained showed that the resin contained approximately three percent lead.

In the above and other tests, the general applicability of the method herein has been shown and it has been found that good results are attained using varying compositions, electrodeposition conditions and substrates.

According to the provisions of the patent statutes, there are described above the invention and what are now considered to be its best embodiments; however, within the scope of the appended claims, it is to be understood that the invention can be practiced otherwise than specifically described.

We claim:

1. In a method of preparing an electrodepositable composition comprising a base solubilized polycarboxylic acid vehicle resin and a pigment composition containing basic lead silico chromate, the step which comprises aging said composition having been only partially neutralized with a base and having a substantial number of free carboxyl groups, for a time sufficient to form lead scraps, thereby increasing the throw power of the composition.

2. The method as in claim 1 wherein the polycarboxylic acid resin has an acid quotient of between about 60 and about 250.

3. In a method of preparing an electrodepositable composition comprising a base solubilized reaction product of a drying oil fatty acid ester with a member of the group consisting of alpha, beta-ethylenically unsaturated dicarboxylic acids, and an anhydride of said acids, and a pigment composition containing basic lead silico chromate, the step which comprises aging said composition having been only partially neutralized with a base and having a substantial number of free carboxyl groups, for a time sufficient to form lead soaps, thereby increasing the throw power of the composition.

4. The method as in claim 3 wherein the vehicle resin has an acid quotient of between about 60 and about 250.

5. In a method of preparing an electrodepositable composition comprising a base solubilized alkyd resin and a pigment composition containing basic lead silico chromate, the step which comprises aging said composition having been only partially neutralized with a base and having a substantial number of free carboxyl groups, for a time sufficient to form lead soaps, thereby increasing the throw power of the composition.

6. A method as in claim 5 where the alkyd resin has an acid quotient between about 60 and about 250.

7. An electrodepositable composition having increased throw power comprising a base solubilized polycarboxylic acid resin vehicle and a basic lead silico chromide pigment, said vehicle resin having lead derived from said pigment chemically bound to said vehicle resin.

8. An electrodepositable composition having increased throw power comprising a base solubilized reaction product of a drying oil fatty acid ester with a member of the group consisting of alpha, beta-ethylenically unsaturated dicarboxylic acids and an anhydride of said acids, and a pigment composition containing basic lead silico chromate, said vehicle resin having lead derived from said pigment chemically bound to said vehicle resin.

9. An electrodepositable composition having increased throw power comprising a base solubilized alkyd resin and a pigment composition containing basic lead silico chromate, said vehicle resin having lead derived from said pigment chemically bound to said vehicle resin.

10. A method of coating a metal substrate which comprises passing electric current between an electrically conductive cathode and said substrate serving as an anode in contact with an aqueous bath comprising an electrodepositable composition comprising a base solubilized polycarboxylic acid resin vehicle and a basic lead silico chromate pigment, said resin vehicle having lead derived from said pigment chemically bound to said resin vehicle, at a voltage higher than the rupture voltage of the system in which substantially no lead is bound to said resin vehicle.

11. A method of coating a metal substrate which comprises passing electric current between an electrically conductive cathode and said substrate serving as an anode in contact with an aqueous bath comprising an electrodepositable composition comprising a base solubilized reaction product of a drying oil fatty acid ester with a member of the group consisting of alpha, beta-ethylenically unsaturated dicarboxylic acids and an anhydride of said acids and a pigment composition containing basic lead silico chromate, said resin vehicle having lead derived from said pigment chemically bound to said resin vehicle, at a voltage higher than the rupture voltage of the system in which substantially no lead is bound to said resin vehicle.

12. A method of coating a metal substrate which comprises passing electric current between an electrically conductive cathode and said substrate serving as an anode in contact with aqueous bath comprising an electrodepositable composition comprising a base solubilized alkyd resin and a pigment composition containing basic lead silico chromate, said resin vehicle having lead derived from said pigment chemically bound to said resin vehicle, at a voltage higher than the rupture voltage of the system in which substantially no lead is bound to said resin vehicle.

13. An article coated by the method of claim 10.

References Cited

UNITED STATES PATENTS

| | | | |
|---|---|---|---|
| 3,230,162 | 1/1966 | Gilchrist | 204—181 |
| 3,293,058 | 12/1966 | Evans et al. | |
| 3,335,103 | 8/1967 | Huggard | 204—181 |
| 3,340,172 | 9/1967 | Huggard | 204—181 |
| 3,362,899 | 1/1968 | Gilchrist | 204—181 |

HOWARD S. WILLIAMS, *Primary Examiner.*

E. ZAGARELLA, JR., *Assistant Examiner.*

U.S. Cl. X.R.

260—37

PO-1050
(5/69)

UNITED STATES PATENT OFFICE
CERTIFICATE OF CORRECTION

Patent No. 3,448,027            Dated June 3, 1969

Inventor(s) Donald P. Hart and Joseph E. Plasynski

It is certified that error appears in the above-identified patent and that said Letters Patent are hereby corrected as shown below:

Column 12, line 14, "scraps" should be "soaps"

SIGNED AND
SEALED

OCT 21 1969

(SEAL)
Attest:

Edward M. Fletcher, Jr.
Attesting Officer

WILLIAM E. SCHUYLER, JR.
Commissioner of Patents